(12) United States Patent
Rosen

(10) Patent No.: US 6,246,449 B1
(45) Date of Patent: *Jun. 12, 2001

(54) DISPLAY UNIT

(75) Inventor: John B. Rosen, Eugene, OR (US)

(73) Assignee: Rosen Products LLC, Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/270,610

(22) Filed: Mar. 17, 1999

Related U.S. Application Data

(63) Continuation-in-part of application No. 29/083,926, filed on Feb. 18, 1998, now abandoned, and a continuation of application No. 08/884,445, filed on Jun. 27, 1997, now Pat. No. 5,946,055, said application No. 29/083,926, is a continuation of application No. 29/058,538, filed on Aug. 16, 1996, now Pat. No. Des. 399,200.

(51) Int. Cl.$^7$ .................................................. H04H 5/64
(52) U.S. Cl. ......................... 348/837; 353/13; 224/311; 296/37.7
(58) Field of Search ............................... 312/7.2, 223.1; 348/837, 839, 840, 841, 842, 843, 836; 224/282, 309, 311, 312, 929, 539; 353/13; 296/37.7, 37.8

(56) References Cited

U.S. PATENT DOCUMENTS

| | | |
|---|---|---|
| D. 285,684 | 9/1986 | Akita et al. . |
| D. 293,579 | 1/1988 | Davis . |
| D. 294,495 | 3/1988 | Nissley . |
| D. 299,491 | 1/1989 | Masuda . |
| D. 337,103 | 7/1993 | Harper . |
| D. 356,081 | 3/1995 | Naito et al. . |

(List continued on next page.)

FOREIGN PATENT DOCUMENTS

| | | |
|---|---|---|
| 3820510 | 12/1989 | (DE) . |
| 41 18 711 | 12/1992 | (DE) . |
| 131 988 | 1/1985 | (EP) . |
| 365 290 | 4/1990 | (EP) . |
| 2 544 675 | 4/1983 | (FR) . |
| 2 276 059 | 9/1994 | (GB) . |
| 60-51087 | 3/1985 | (JP) . |
| 60-51088 | 3/1985 | (JP) . |

(List continued on next page.)

OTHER PUBLICATIONS

LCD Video System Product Specification Sheet, a company named Korea Electronics Co. Ltd. contends that it showed this sheet of paper to some people at the Nov. 5–8, 1996 Specialty Equipment Manufacturers Association (SEMA) trade show in Las Vegas, Nevada.

"TV for Cars", Soviero, *Popular Science*, pp. 88–89, Dec. 1990.

*Primary Examiner*—Peter M. Cuomo
*Assistant Examiner*—Jerry A. Anderson
(74) *Attorney, Agent, or Firm*—Kolisch Hartwell Dickinson McCormack & Heuser

(57) ABSTRACT

A display unit is provided, the display unit including a housing configured for mounting in an interior region of a vehicle, and a screen mounted on the housing for movement between a stowed position wherein the screen is at least partially contained within the housing and a deployed position wherein the screen projects from the housing to reveal a viewing surface of the screen The display unit further includes a lock mechanism adapted to selectively retain the screen in the stowed position. Upon release of the lock mechanism, however, the screen is free to be pivoted away from the stowed position, and in one embodiment, is automatically pivoted at least partially away from the stowed position.

4 Claims, 4 Drawing Sheets

U.S. PATENT DOCUMENTS

| | | |
|---|---|---|
| D. 366,067 | 1/1996 | Mowrey . |
| D. 395,458 | 6/1998 | Smith et al. . |
| 4,195,431 | 4/1980 | Neufeld . |
| 4,383,626 | 5/1983 | Weinblatt . |
| 4,438,458 | 3/1984 | Munscher . |
| 4,504,910 | 3/1985 | Araki et al. . |
| 4,516,157 | 5/1985 | Campbell . |
| 4,620,808 | 11/1986 | Kurtin et al. . |
| 4,630,821 | 12/1986 | Greenwald . |
| 4,633,323 | 12/1986 | Haberkern et al. . |
| 4,635,110 | 1/1987 | Weinblatt . |
| 4,647,980 | 3/1987 | Steventon et al. . |
| 4,665,430 | 5/1987 | Hiroyasu . |
| 4,708,312 | 11/1987 | Rohr . |
| 4,735,467 | 4/1988 | Wolters . |
| 4,742,478 | 5/1988 | Nigro, Jr. et al. . |
| 4,749,364 | 6/1988 | Arney et al. . |
| 4,787,040 | 11/1988 | Ames et al. . |
| 4,814,896 | 3/1989 | Heitzman et al. . |
| 4,824,159 | 4/1989 | Fluharty et al. . |
| 4,836,486 | 6/1989 | Vossoughi et al. . |
| 4,843,477 | 6/1989 | Mizutani et al. . |
| 4,866,515 | 9/1989 | Tagawa et al. . |
| 4,867,498 | 9/1989 | Delphia et al. . |
| 4,870,676 | 9/1989 | Lewo . |
| 4,883,242 | 11/1989 | Becker et al. . |
| 4,910,591 | 3/1990 | Petrossian et al. . |
| 4,915,461 | 4/1990 | Kingsborough et al. . |
| 4,947,296 | 8/1990 | Takeuchi et al. . |
| 4,982,996 | 1/1991 | Vottero-Fin et al. . |
| 4,983,951 | 1/1991 | Igarashi et al. . |
| 4,988,140 | 1/1991 | Van Order . |
| 4,995,680 | 2/1991 | Miruri . |
| 5,009,384 | 4/1991 | Gerke et al. . |
| 5,021,922 | 6/1991 | Davis et al. . |
| 5,027,200 | 6/1991 | Petrossian et al. . |
| 5,034,996 | 7/1991 | Carey et al. . |
| 5,061,996 | 10/1991 | Schiffman . |
| 5,076,524 | 12/1991 | Reh et al. . |
| 5,096,271 | 3/1992 | Portman . |
| 5,096,287 | 3/1992 | Kakinami et al. . |
| 5,111,289 | 5/1992 | Lucas et al. . |
| 5,121,200 | 6/1992 | Choi . |
| 5,144,290 | 9/1992 | Honda et al. . |
| 5,145,128 | 9/1992 | Umeda . |
| 5,148,282 | 9/1992 | Sedighzadeh . |
| 5,161,028 | 11/1992 | Kawata et al. . |
| 5,173,686 | 12/1992 | Fujihara . |
| 5,177,616 | 1/1993 | Riday . |
| 5,179,447 | 1/1993 | Lain . |
| 5,195,709 | 3/1993 | Yasushi . |
| 5,222,690 | 6/1993 | Jeffords . |
| 5,233,426 | 8/1993 | Suzuki et al. . |
| 5,239,700 | 8/1993 | Guenther et al. . |
| 5,243,417 | 9/1993 | Pollard . |
| 5,281,985 | 1/1994 | Chan . |
| 5,287,191 | 2/1994 | Suzuki et al. . |
| 5,289,321 | 2/1994 | Secor . |
| 5,305,970 | 4/1994 | Porter et al. . |
| 5,311,302 | 5/1994 | Berry et al. . |
| 5,333,416 | 8/1994 | Harris et al. . |
| 5,335,076 | 8/1994 | Reh et al. . |
| 5,338,081 | 8/1994 | Young et al. . |
| 5,359,349 | 10/1994 | Jambor et al. . |
| 5,362,144 | 11/1994 | Shioya et al. . |
| 5,397,160 | 3/1995 | Landry . |
| 5,467,106 | 11/1995 | Salomon . |
| 5,469,298 | 11/1995 | Suman et al. . |
| 5,522,638 * | 6/1996 | Falcoff et al. ................. 296/37.8 |
| 5,547,248 | 8/1996 | Marechal . |
| 5,574,443 | 11/1996 | Hsieh . |
| 5,583,735 | 12/1996 | Pease et al. . |
| 5,743,487 | 4/1998 | Rice . |
| 5,775,762 | 7/1998 | Vitito . |
| 5,822,023 * | 10/1998 | Suman et al. ................. 348/837 |
| 5,927,784 | 7/1999 | Vitito . |
| 5,946,055 | 8/1999 | Rosen . |

FOREIGN PATENT DOCUMENTS

| | | |
|---|---|---|
| 60-203526 | 10/1985 | (JP) . |
| 61-77542 | 4/1986 | (JP) . |
| 61-282139 | 12/1986 | (JP) . |
| 62-231847 | 10/1987 | (JP) . |
| 63-219440 | 9/1988 | (JP) . |
| 1-300775 | 12/1989 | (JP) . |
| 2-7082 | 1/1990 | (JP) . |
| 2-31577 | 2/1990 | (JP) . |
| 2-149083 | 6/1990 | (JP) . |
| 3-10476 | 1/1991 | (JP) . |
| 4-63739 | 2/1992 | (JP) . |
| 4-185547 | 7/1992 | (JP) . |
| 4-368245 | 12/1992 | (JP) . |
| 5-24486 | 2/1993 | (JP) . |
| 5-50883 | 3/1993 | (JP) . |
| 5-131879 | 5/1993 | (JP) . |
| 5-185878 | 7/1993 | (JP) . |
| 6-92187 | 4/1994 | (JP) . |
| 6-144009 | 5/1994 | (JP) . |

* cited by examiner

DISPLAY UNIT

CROSS REFERENCE TO RELATED APPLICATIONS

This application is a continuation of U.S. patent application Ser. No. 08/884,445, filed Jun. 27, 1997 now U.S. Pat. No. 5,946,055 of John B. Rosen for a DISPLAY UNIT, the disclosure of which is hereby incorporated by reference. This application is also a continuation-in-part of U.S. Design patent application Ser. No. 29/083,926 of John B. Rosen for a CEILING-MOUNTED MONITOR SYSTEM, filed on Feb. 18, 1998, now abandoned which continues from U.S. Design patent application Ser. No. 29/058,538 of John B. Rosen for a CEILING-MOUNTED MONITOR SYSTEM, filed on Aug. 16, 1996 now U.S. Pat. No. Des. 399,200.

TECHNICAL FIELD

The present invention relates generally to display units, and more particularly, to a display unit configured for use in presenting a viewing surface to occupants of an automobile such as a car, a truck, a sport utility vehicle (SUV), or a passenger van.

BACKGROUND ART

Automotive manufacturers have long sought to make passengers as comfortable as possible during travel, focusing both on physical comfort and on the passenger's entertainment. For example, vehicle sound systems have become standard accessories in most cars and trucks. In recent years, efforts have involved attempts to bring video technology into the passenger compartment, either in the form of a television, a computer, or a video game display.

Unfortunately, display units have heretofore been impractical as automotive accessories due to problems in mounting conventional display units within a vehicle. One problem relates to the size of most display units, it being difficult to find space for a standard-size monitor in most vehicles. Another problem arises from difficulties in placing the display unit in a position where it may be viewed by a passenger, but will not obstruct the drivers view of the road. Still another problem involves the stowability of the display unit, and its corresponding effect on passenger safety.

Known display units also have been unable to meet consumer expectations due to difficulties in providing acceptable picture quality in a package of suitable size. However, with advancements in flat-panel display technology, picture quality of smaller display units has improved dramatically. Additionally, it has become possible to separate some of the electronic circuitry from the flat-panel display, further reducing the thickness of these displays. The present invention takes advantage of these improvements by providing a stowable display unit which is suited for mounting in an interior region of an automobile without compromising picture quality.

DISCLOSURE OF THE INVENTION

The aforementioned goals and objectives are met by provision of a display unit which includes a housing configured for mounting in an interior region of an automobile, and a screen mounted on the housing for movement between a stowed position wherein the screen is at least partially contained within the housing and a deployed position wherein the screen projects from the housing to reveal a viewing surface of the screen. The display unit further includes a lock mechanism adapted to selectively retain the screen in the stowed position. Upon release of the lock mechanism, however, the screen is free to be pivoted away from the stowed position, and in one embodiment, is automatically pivoted at least partially away from the stowed position.

These and other objects and advantages of the present invention will be more readily understood after a consideration of the drawings and the detailed description of the preferred embodiment which follows.

DETAILED DESCRIPTION OF THE PREFERRED EMBODIMENT AND BEST MODE OF CARRYING OUT THE INVENTION

Referring initially to FIGS. 1 through 4, a display unit is shown for use in an interior region of an automobile 10, such display unit being indicated generally at 12. Although the invention has broad utility, the display unit is shown mounted on the ceiling 10a of the automobile, preferably overhead and generally forward of the of the passenger seating area 14 so as to accommodate viewing thereof by one or more rear-seat passengers P.

Figure 1:
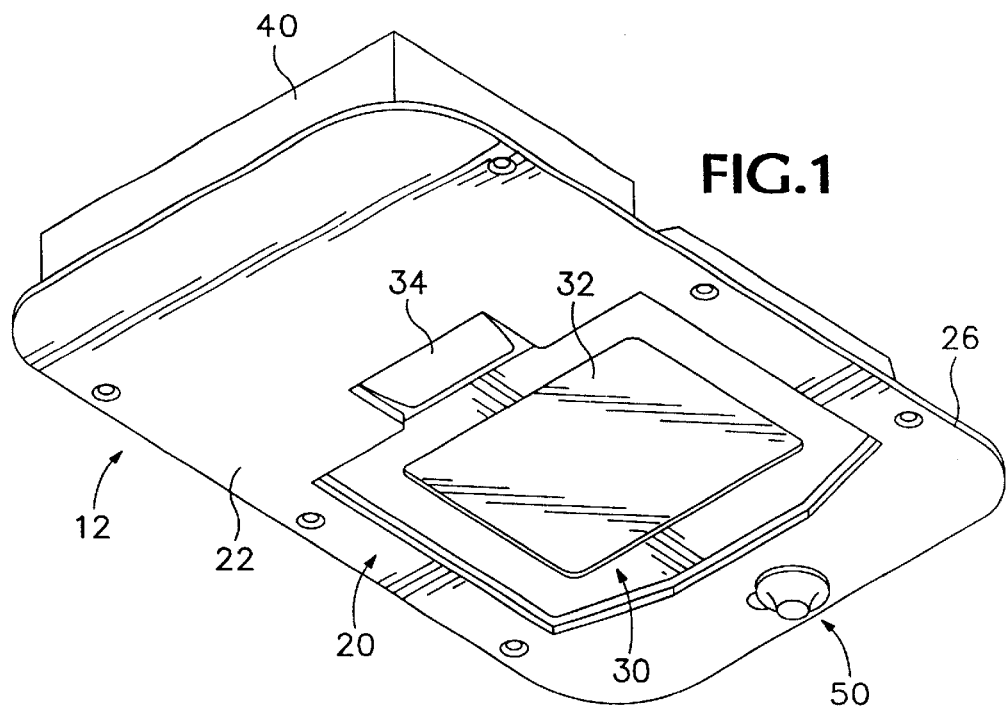
FIG. 1 is an isometric view of a display unit constructed in accordance with the present invention, the display unit including a screen shown in a stowed position.
Figure 2:
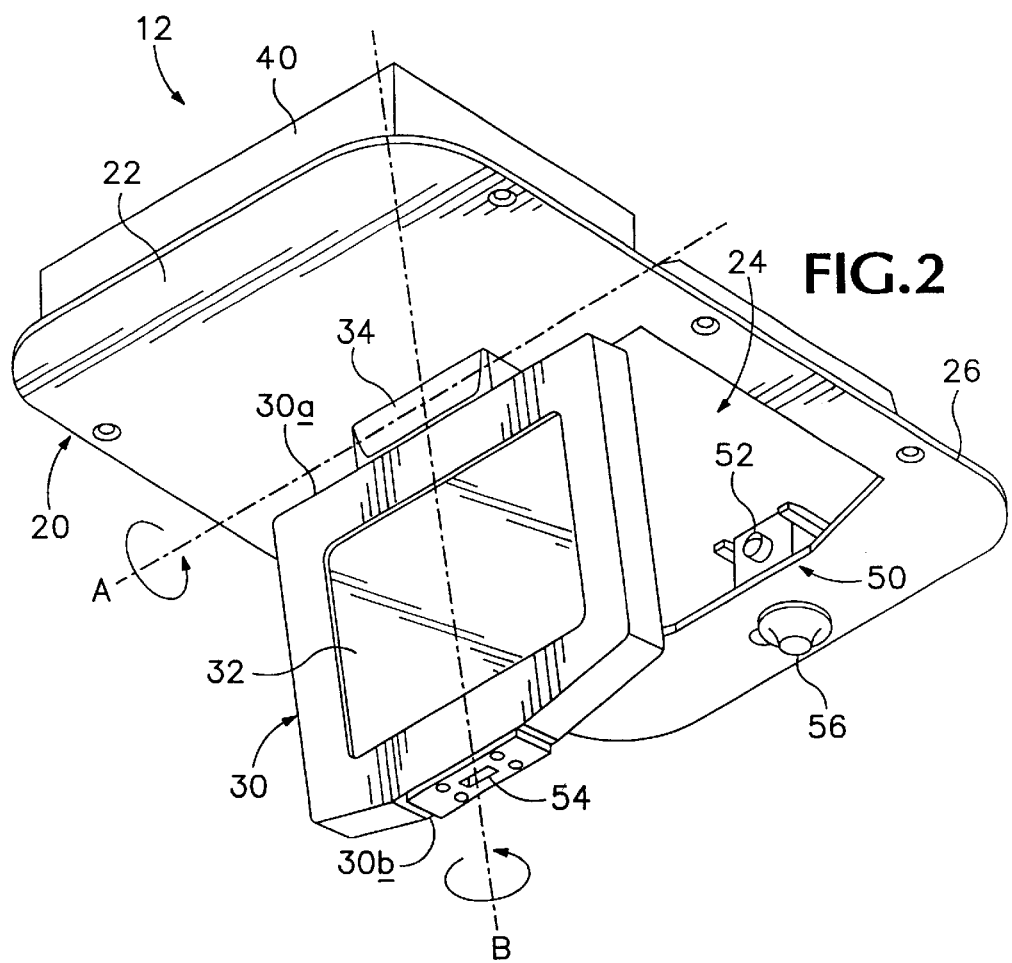
FIG. 2 is an isometric view similar to that of FIG. 1, but with the screen pivoted to a deployed position.
Figure 3:
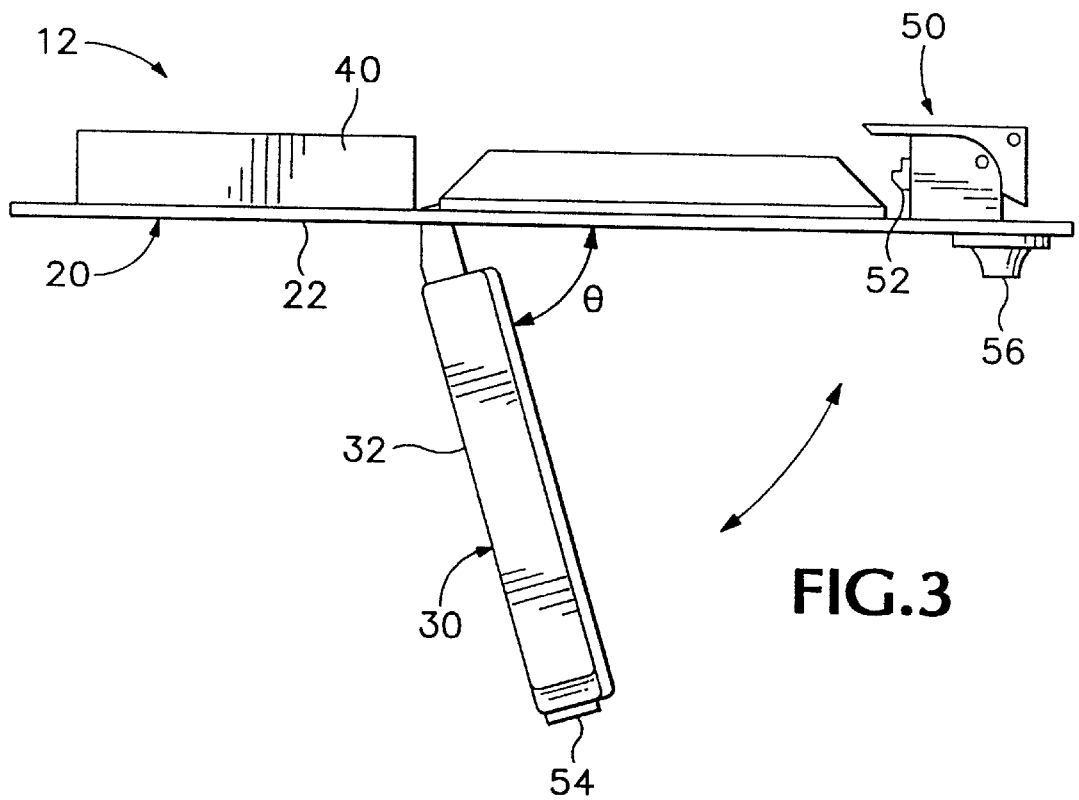
FIG. 3 is a side view of the display unit shown in FIGS. 1 and 2.
Figure 4:
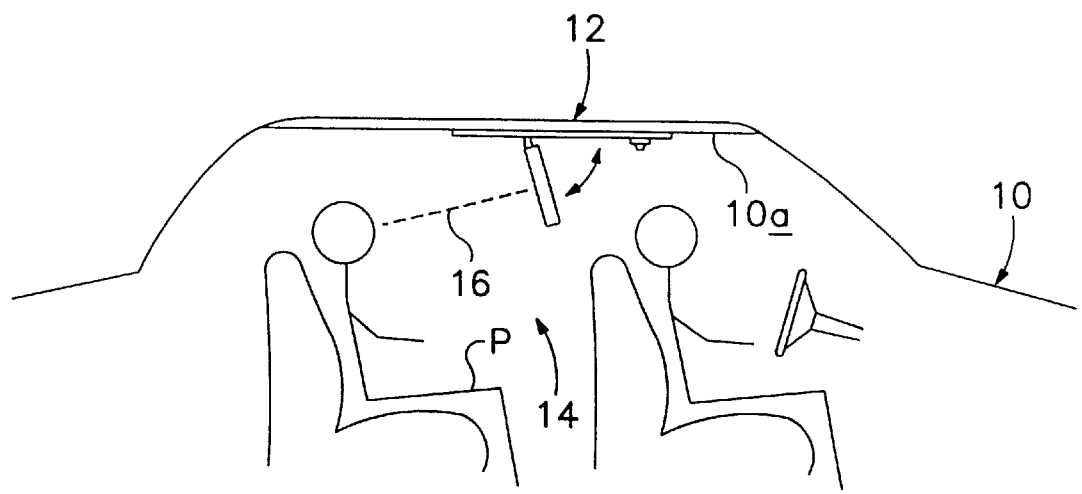
FIG. 4 is a somewhat simplified side view of an automotive interior illustrating use of the display unit depicted in FIGS. 1, 2 and 3.

The display unit includes a generally planar mounting frame structure in the form of a housing 20, and a corresponding screen 30, which is mounted on the housing for movement between a stowed position (FIG. 1) and a deployed position (FIG. 2). In the stowed position, the screen is contained within the housing, a viewing surface 32 thereof typically facing downward into the passenger compartment. In the deployed position, the screen projects from the housing to present the screen's viewing surface to rear-seat passenger P. The screen's viewing surface thus selectively is placed in the rear-seat passenger's line-of-sight 16.

In accordance with my teachings, housing 20 will be seen to include a perimeter structure 22 having a proximal portion closer to the passenger seating area and a distal portion more remote from the passenger seating area. The housing defines a cavity 24 configured to receive the screen when the screen is placed in its stowed position. The cavity is of predetermined shape and size, typically conforming substantially to the shape and size of the viewing screen. It will be noted in FIGS. 1 and 2, for example, that cavity 24 is configured to accommodate fitted receipt of screen 30 such that the screen is fully contained within the cavity.

The housing typically is embedded in the ceiling, the automobile being provided with a ceiling recess configured for receipt of the housing. Accordingly, the perimeter structure includes a generally planar flange 26 which may be secured to the ceiling via conventional fasteners such as screws. The flange is configured to conform to the contour of the ceiling, and preferably defines the lowermost surface of the housing. The housing thus may be flush-mounted with the ceiling. Furthermore, when the screen is in its stowed position with the screen contained within the cavity, the screen's viewing surface is flush with the flange, and correspondingly, is flush with the automobile's ceiling.

In the depicted embodiment, the screen is separated from a video control module 40 which directs operation of the screen. The control module typically is mounted on the perimeter structure beside the screen and is connected to the screen via a ribbon wire or the like. This keeps the display unit relatively thin. In the depicted embodiment, for example, the display unit is approximately ½-inch to 1½-inches thick.

As indicated, viewing screen 30 is hinged to the housing adjacent the distal portion thereof to accommodate reversible swaying thereof in an upright plane which extends both through the housing and through the passenger seating area. The screen thus is deployed by pivot thereof about a first axis A which corresponds generally to a first edge 30a of the screen. To deploy the screen, the screen is pivoted in a rearward direction to a deployed position where the screen is at an angle θ from horizontal. In the depicted embodiment, θ is within a range of between approximately 45-degrees and 90-degrees. This presents the screen's viewing surface to rear-seat passenger P. The screen also may be retracted to its stowed position, again by pivot of the screen about axis A. Pivot occurs about a hinge which is shown generally at 34.

The screen also is pivotal about a second axis B which is transverse to first axis A. Accordingly, the screen is adjustable by side-to-side rotation of the screen so as to selectively face the screen's viewing surface toward a rear-seat passenger. The screen's viewing surface thus may selectively be placed in the rear-seat passenger's line of sight.

The display unit also employs a locking mechanism which selectively maintains the screen in its stowed position. The locking mechanism includes a catch 52 mounted on the housing and configured to selectively engage a corresponding recess or detent 54 in the screen's second edge 30b. The locking mechanism is operable via a lever 56 which extends (and retracts) the catch for capture (and release) by recess 54.

Figure 5:
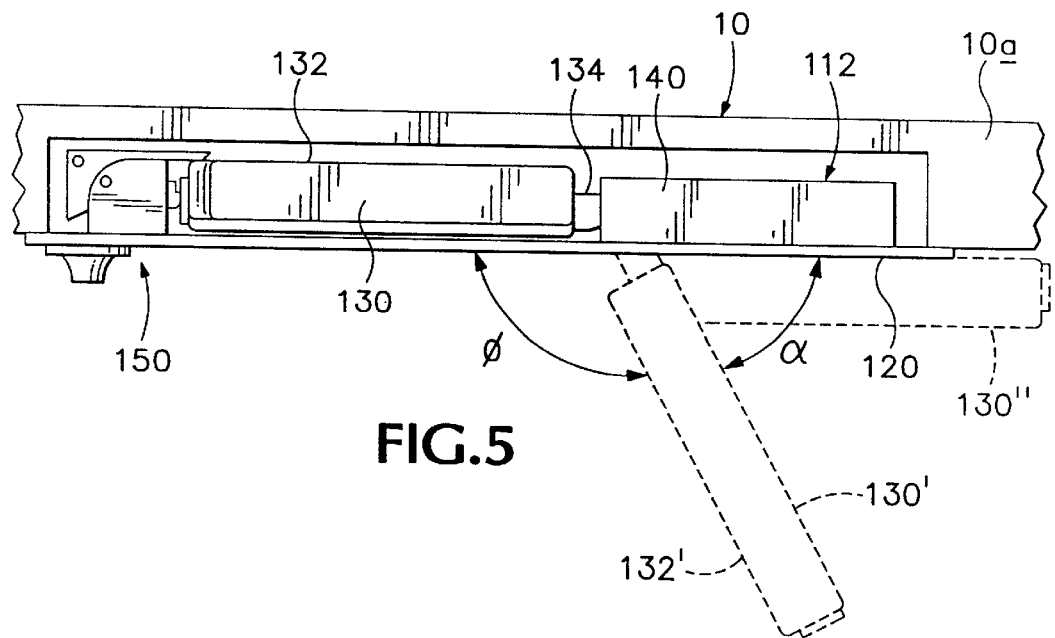
FIG. 5 is a sectional side view of a first alternative embodiment display unit, the display unit screen being shown in successive positions by dashed lines.

A first alternative embodiment display unit is shown at 112 in FIG. 5, the alternative display unit differing from display unit 12 primarily by its provision of a break-away screen 130. The screen is mounted on a display unit housing 120, typically for pivot between a stowed position and a deployed position to present a viewing surface 132 to a passenger in the passenger viewing area.

As indicated, display unit 112 is suited for use in an automobile 10, the display unit typically being embedded in the automobile ceiling with housing 120 flush-mounted on ceiling 10a. The screen is hingedly attached to the housing via break-away hinge 134 for pivot between a generally horizontal first orientation wherein the screen is at least partially contained within cavity 124, and a second orientation wherein the screen extends downwardly from the cavity to present the screen's viewing surface to a vehicle occupant for viewing.

In its first orientation (shown in solid lines), screen 130 is in a stowed position where the screen is contained within cavity 124, the screen's viewing surface facing upwardly into the cavity so as to protect the viewing surface from damage. The screen is stowed adjacent control module 140, and may be locked in place by locking mechanism 150.

Upon deployment, the screen is pivoted under a first torque from its first orientation (shown in solid lines at 130) to its second orientation (shown in dashed lines at 130') where the screen is in a deployed position with the screen extending downwardly from the ceiling at an angle a of between approximately 45-degrees and 90-degrees. The screen thus is pivoted though an angle φ which is between approximately 90-degrees and 135-degrees. The screen's viewing surface 132' faces rearwardly and downwardly toward the automobile's rear-seat passengers.

Upon application of a second, higher torque, the screen may be pivoted from the second orientation (shown in dashed lines at 130') to its third orientation (shown in dashed lines at 130") where the screen rests against the housing in a break-away position. This is accomplished via a two-phase hinge 134 which defines a first range of motion (between the first and second orientations) wherein the screen pivots upon application of a first torque, and a second range of motion (between the second and third orientations) wherein the screen pivots upon application of a higher second torque. As will be appreciated by those skilled in the art, the change in torque creates a soft stop with the screen in the second orientation, a feature which provides for quick deployment of the screen.

The ability of the screen to pivot to the third orientation serves as a safety to feature, the screen effectively being configured to collapse in the event of an emergency. It will be understood, for example, that the depicted screen will pivot forward from the second orientation upon contact by a rear-seat passenger who is thrown forward in a collision, but only upon application of a predetermined threshold force. Similarly, the screen is configured to pivot toward the rear of the vehicle upon application of an opposite force. In either event, the screen will yield upon application of sufficient force, and thus will not act as a hard stop of the type which may cause injury to vehicle occupants.

FIGS. 6 through 9 show a second alternative embodiment of the invented display unit at 212, such display unit being adapted for use in a vehicle having a sunroof or the like. It will be noted that the display unit includes a surface-mounted housing 220. The housing defines a cavity 224 which is configured to house a screen 230 having a viewing surface 232. The screen may be deployed to reveal the viewing surface, typically first by translation in a plane defined by the screen, and second by pivot about an axis defined by hinge 234. The screen thus typically is mounted on a carriage 236 for translation along a track 238. The hinge is positioned along a predetermined edge of the screen to provide for pivot of the screen once it has been removed from the cavity.

Figure 6:
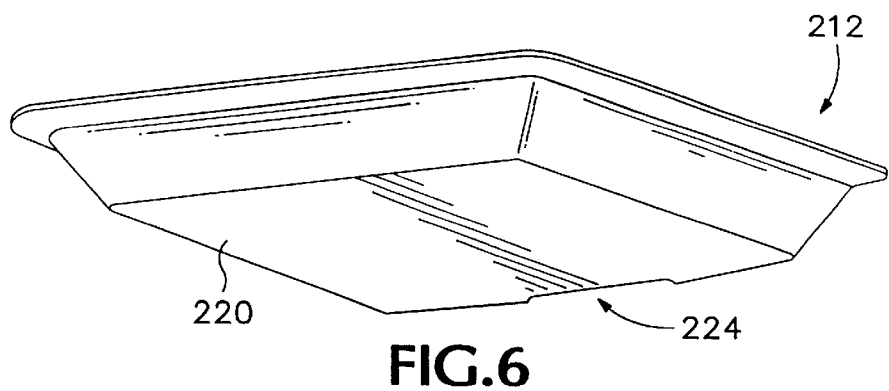
FIG. 6 is an isometric view of a second alternative embodiment display unit, the display unit including a screen in a stowed position.
Figure 7:
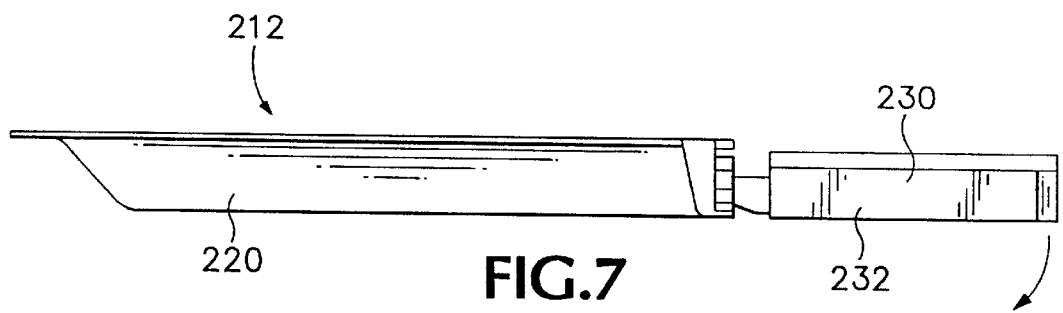
FIG. 7 is a side view of the display unit of FIG. 6, but with the screen in an intermediate position.
Figure 8:
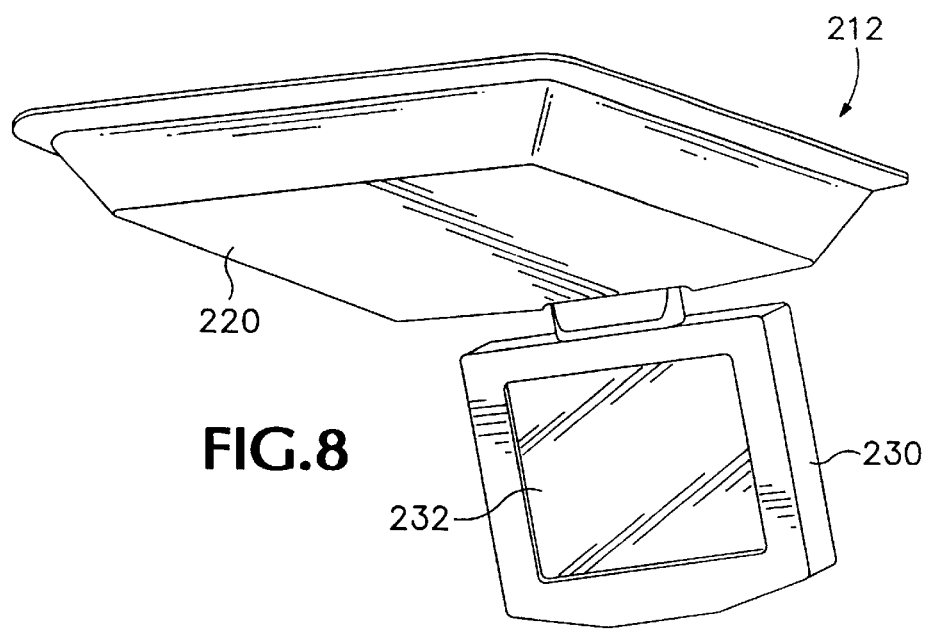
FIG. 8 is an isometric view of the display unit of FIG. 6, but with the screen in a deployed position.
Figure 9:
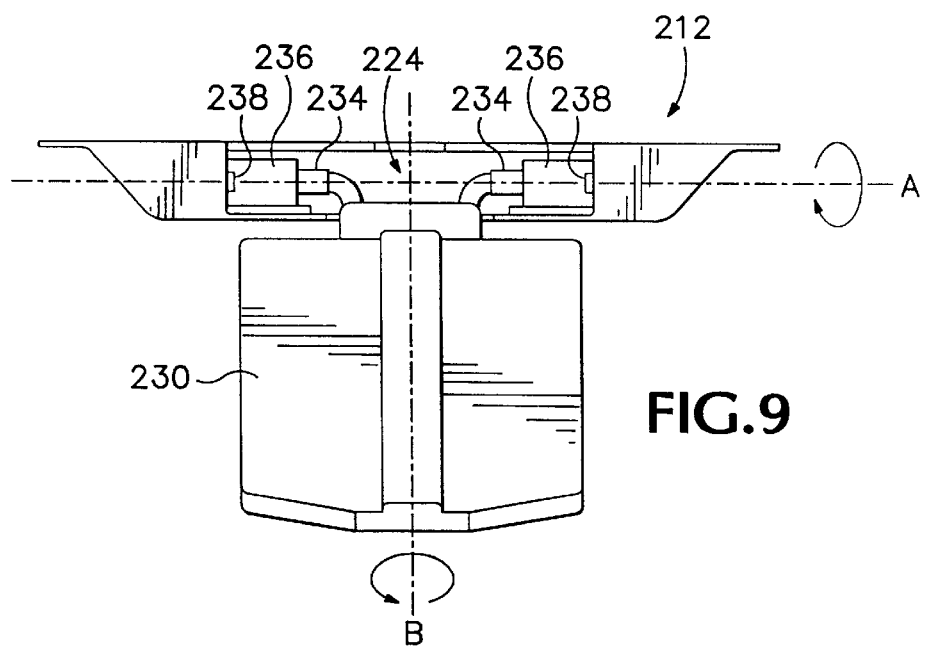
FIG. 9 is an end view of the display unit of FIG. 6, the screen being deployed to reveal a track, carriage and hinge arrangement for use in deploying the screen.

In FIG. 6, the screen is shown in its first position where the screen is contained within the cavity in a generally horizontal orientation. From the first position, the screen is translated along track 236 to an intermediate position with the screen still in the generally horizontal orientation. FIG. 7 shows the screen in the intermediate position. Thereafter, the screen is pivoted about a first axis A to a second position where the screen extends downwardly from the cavity to present the screen to a vehicle occupant for viewing. FIG. 8 shows the screen in the second position. The screen also may be rotatable about a second axis B which is transverse to the first axis.

The screen is configured to pass forwardly in the vehicle along track 236, and then to pivot rearwardly to the deployed orientation under a predetermined first torque. The screen typically will pivot downstream to an angle of between approximately 45-degrees and 90-degrees from horizontal such that the viewing surface may be readily seen by rear-seat passengers. It is possible, however, to provide for further downstream pivot of the screen under a higher second torque to provide for emergency collapse of the screen.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicant's invention.

I claim:

1. In an automobile having a generally planar ceiling, with windows and a passenger seating area through which a driver has a view of an interior and exterior of the automobile, a ceiling-mounted automobile display unit comprising:
   a mounting frame structure embedded in the ceiling in a central location overhead and generally forward of the passenger seating area in the automobile;
   a hinge;
   a direct-view screen structure hinged to the mounting frame structure via the hinge for reversibly swaying the screen structure in an upright plane which extends through the passenger seating area, the screen structure being configured to pivot between a stowed position wherein the screen structure parallels the ceiling and a deployed position wherein the screen structure projects downwardly from the ceiling with a viewing surface in a disposition which is overhead-viewable by a passenger seated in the passenger seating area; and
   a video control module configured to direct operation of the direct-view screen structure the video control module being electrically connected to the screen structure, mounted adjacent the screen structure and supported by the frame structure at a fixed location separate from the screen structure and above the lower surface of the ceiling.

2. In an automobile having a ceiling, with windows and a passenger seating area through which a driver has a view of an interior and exterior of the automobile, an above-seat-level, ceiling-mounted display unit comprising:
   a housing having a lower surface generally coextensive with a lower surface of the ceiling;
   a mounting fame structure joined with the ceiling in a location overhead of the passenger seating area in the automobile, the mounting frame structure being joined generally co-planarly with the ceiling and having a proximal portion closer to the passenger seating area and distal portion more remote from the passenger seating area; and
   a direct-view screen structure hinged to the mounting frame structure for reversibly swaying in an upright plane, extending both through the mounting frame structure and the passenger seating area, between a stowed position wherein the screen structure lies in a plane generally paralleling the housing and a deployed position wherein the screen structure is pivoted downwardly from the stowed position to lie at an angle relative to the ceiling with a disposition which is overhead-viewable by any passenger seated in the passenger seating area;
   a video control module configured to direct operation of the direct-view screen structure, the video control module being electrically connected to the screen structure, mounted adjacent the screen structure and supported by the frame structure at a fixed location separate from the screen structure and above the lower surface of the housing; and
   wherein the screen structure has a thickness of less than 1.5 inches.

3. An overhead automotive display unit for an automobile having a ceiling, and having windows and a passenger seating area through which a driver has a view of an interior and exterior of the automobile, the display unit comprising:
   an automotive-ceiling-mounted housing defining a cavity of a shape and size located in a central region of the ceiling, with the cavity being positioned generally above a pane defined by a lower surface of the ceiling, and with the housing having a lower-surface generally coextensive with a lower surface of the ceiling;
   a direct-view screen sized to fit at least partially within the cavity, the screen having a viewing surface that is located generally rearward of the windshield in the central region of the ceiling and being mounted on the housing by a hinge for pivotal movement about a first axis spaced from, and extending generally parallel to, an edge of the screen, the screen being pivotal between a stowed position wherein the screen is at least partially contained within the cavity of the housing ceiling, and a deployed position wherein the screen pivotally projects from the cavity of the housing to present the viewing surface to an automobile passenger;
   a video control module configured to direct operation of the direct-view screen structure, the video control module being electrically connected to the screen structure, mounted adjacent the screen and support by the housing at a fixed location separate from the screen structure and above the lower surface of the housing; and
   wherein the screen has a thickness of less than 1.5 inches.

4. In an automobile having a generally planar ceiling, with windows and a passenger seating area through which a driver has a view of an interior and exterior of the automobile, a ceiling-mounted automotive display unit comprising:
   a an automotive-ceiling-mounted housing having a lower surface generally coextensive with a lower surface of the ceiling;
   a direct-view screen structure having a thickness of less than 1.5 inches and being operatively hinged to the ceiling via the housing in a location overhead and generally forward of the passenger seating area in the automobile for reversibly swaying in an upright plane which extends through the passenger seating area, the screen structure being configured to pivot between a stowed position wherein the screen structure is in coplanar relation to the ceiling in an orientation which does not obstruct the driver's view, and a deployed position wherein the screen structure projects downwardly from the ceiling at an angle relative to the ceiling in an orientation which accommodates the driver's access to the driver's view, the deployed position presenting a viewing surface generally rearward of the windshield in a central region of the ceiling in a disposition overhead-viewable by passengers seated in the passenger seating area; and a video control module configured to direct operation of the direct-view screen structure, the video control module being electrically connected to the screen structure, mounted adjacent the screen structure and supported by the housing at a fixed location separate from the screen structure, and above the lower surface of the housing.

* * * * *